US011937739B2

(12) United States Patent
Fries (10) Patent No.: US 11,937,739 B2
(45) Date of Patent: Mar. 26, 2024

(54) SPICE MILL PART AND METHOD FOR PRODUCING A SPICE MILL PART

(71) Applicant: JOMA KUNSTSTOFFTECHNIK GMBH, Brunn am Gebirge (AT)

(72) Inventor: Rudolf Fries, Kaumberg (AT)

(73) Assignee: JOMA KUNSTSTOFFTECHNIK GMBH, Brunn am Gebirge (AT)

( * ) Notice: Subject to any disclaimer, the term of this patent is extended or adjusted under 35 U.S.C. 154(b) by 23 days.

(21) Appl. No.: 17/772,175

(22) PCT Filed: Nov. 4, 2020

(86) PCT No.: PCT/AT2020/060385
§ 371 (c)(1),
(2) Date: Apr. 27, 2022

(87) PCT Pub. No.: WO2021/087537
PCT Pub. Date: May 11, 2021

(65) Prior Publication Data
US 2022/0369865 A1    Nov. 24, 2022

(30) Foreign Application Priority Data
Nov. 4, 2019 (AT) .................................. 50939/2019

(51) Int. Cl.
*A47J 42/38* (2006.01)
*A47J 42/02* (2006.01)
(Continued)

(52) U.S. Cl.
CPC ............... *A47J 42/38* (2013.01); *A47J 42/04* (2013.01)

(58) Field of Classification Search
CPC .................................................. A47J 2201/00
See application file for complete search history.

(56) References Cited

U.S. PATENT DOCUMENTS

2016/0015214 A1\* 1/2016 Lægdsgaard ........... A47J 42/10
241/257.1

FOREIGN PATENT DOCUMENTS

| CN | 107041695 A | 8/2017 |
|---|---|---|
| DE | 20 2007 001563 U1 | 4/2007 |

(Continued)

OTHER PUBLICATIONS

English translate (JP2014108192A), retrieved date Jul. 8, 2023.\*
(Continued)

*Primary Examiner* — Matthew Katcoff
*Assistant Examiner* — Mohammed S. Alawadi
(74) *Attorney, Agent, or Firm* — GREENBLUM & BERNSTEIN. P.L.C.

(57) ABSTRACT

A spice mill part, more particularly a spice mill lower part, for a spice mill, having a housing, which consists at least in part of a plastic material and which can be rotatably connected to a further spice mill part, more particularly a spice mill upper part. A receiving element is provided on the housing, in which receiving element there is arranged a milling element being particularly a milling ring, made from a ceramic material, with the milling element being clamped in the receiving element in a frictionally engaged manner by a compressive force directed substantially radially inwardly and acting on a self-contained outer bearing face of the milling element, the compressive force acting substantially along the entire circumference on the external bearing face of the milling element.

20 Claims, 7 Drawing Sheets

(51) Int. Cl.
*A47J 42/04* (2006.01)
*A47J 42/10* (2006.01)

(56) References Cited

FOREIGN PATENT DOCUMENTS

| | | |
|---|---|---|
| DE | 10 2016 106597 A1 | 9/2016 |
| DE | 10 2015 121237 A1 | 6/2017 |
| JP | H04135462 | 5/1992 |
| JP | 2014108192 A * | 6/2014 |
| JP | 6912345 B2 * | 8/2021 |
| WO | 2016/207740 A1 | 12/2016 |

OTHER PUBLICATIONS

English translate (JP6912345B2), retrieved date Jul. 8, 2023.*
International Search Report issued in International Patent Application No. PCT/AT2020/060385, dated Feb. 1, 2021, along with an English translation thereof.
Written Opinion of the International Searching Authority issued in International Patent Application No. PCT/AT2020/060385, dated Feb. 1, 2021.

* cited by examiner

SPICE MILL PART AND METHOD FOR PRODUCING A SPICE MILL PART

The invention relates to a spice mill part, in particular a spice mill lower part, for a spice mill, with a housing which consists at least partially of a plastic material, and can be rotatably connected to another spice mill part, in particular a spice mill upper part, wherein a receiving element is provided on the housing, in which is arranged a milling element, in particular a milling ring, made from a ceramic material. Furthermore, the invention relates to a spice mill and a spice grinder, each with such a spice mill part, together with a method for producing the spice mill part.

Generic spice mills usually have a spice mill lower part and a spice mill upper part, that is to say, a rotor and a stator, both of which are provided with milling elements for the milling of spices, wherein the spice mill upper part is usually rotatably mounted relative to the spice mill lower part, which is connected to a spice container. By rotation of the spice mill upper part relative to the spice mill lower part, the milling elements are rotated relative to each other and the spice is thereby milled in a milling gap between the milling elements.

Spice mill parts, and spice mills, of the type mentioned in the introduction, are of known art from DE 10 2015 121 237 B4, or DE 10 2016 106 597 B4, amongst other publications.

Other spice mills are of known art from WO 2016/207740 A1, CN 107041695 A and JP H04135462 A.

The housings of spice mill parts are typically produced in a plastic injection moulding process. If a ceramic milling element is provided, this is manufactured separately from the production of the housing in a separate production process, and is then inserted into a receiving element of the housing. Disadvantageously, ceramic parts, in particular, have comparatively large manufacturing tolerances, such that the outer diameter of the milling element can often fluctuate by approx. 0.5 to 0.8 mm for conventional mill sizes. In order nevertheless to ensure that the milling element can be reliably inserted into the receiving element, the inner diameter of the receiving element is usually designed such that even milling elements with the largest dimension within the tolerance range can still easily be inserted into the receiving element. This leads to the fact that the outer diameter of the ceramic part is in all cases smaller than the inner diameter of the receiving element, and thus the ceramic part is mounted floating in the receiving element. Disadvantageously, the problem often arises that very fine and therefore invisible hairline cracks can occur in the milling elements during production of the milling elements, which can then lead to fracture or chipping of parts of the milling element when using the spice mill part, due to the compressive forces acting from the inside to the outside during a milling process and the floating mounting of the milling element. In the worst case, a fracture of a milling element can lead to a completely defective spice mill. In the case of chippings, the chipped parts of the milling element can get onto food together with the milled spices, and can therefore pose a danger. Most fractures and chippings occur in the milling rings in the spice mill lower part.

In view of the above statements, it is the object of the present invention to alleviate, or even eliminate completely, the disadvantages of the prior art. In particular, it is the object of the invention to provide a spice mill part of the type mentioned in the introduction, in which the risk of a fracture or chipping of the milling element is reduced or completely avoided.

This object is achieved by a spice mill part with the features of Claim 1.

Accordingly, in accordance with the invention provision is made for the milling element to be clamped in the receiving element in a force fit by means of a compressive force directed, in particular, essentially radially inwards, and acting on a closed outer bearing face of the milling element, wherein the compressive force acts essentially along the entire circumference on the external bearing face of the milling element. Advantageously, the inwardly directed compressive force acting on the outer bearing face preferably achieves an essentially full-surface contact between the outer bearing face of the milling element and an inner bearing face of the receiving element, such that compressive forces acting on the milling element from the inside during a milling process are transmitted to the receiving element over a large region, thus reducing the risk of the propagation of hairline cracks, and thereby considerably reducing the risk of consequential damage such as fractures or chipping. The clamping provided by the force fit of the milling element in the spice mill part also prevents unintentional displacements of the same, which can further reduce the risk of other defects of the spice mill, such as the wedging of milling elements that can be rotated relative to each other. The force fit between the milling element and the receiving element can, in particular, be created in that the (nominal) inner circumference of the receiving element is smaller than the (nominal) outer circumference of the milling element when it is produced, that is to say, in the uninserted state of the milling element. In other words, during its production the receiving element has a (nominal) inner diameter that is smaller than a (nominal) outer diameter of the milling element. The (nominal) inner diameter of the receiving element is preferably smaller than the (nominal) outer diameter of the milling element by at least 0.01 mm, even more preferably by 0.1 mm. The prefix "(nominal)" is intended to make clear that tolerances occur during production of the spice mill part. If reference is made to dimensions in the following, reference is being made to the nominal dimension in each case, unless otherwise specified. As a result, the milling element is pressed into the receiving element in the assembled state of the spice mill part. The pressing-in or clamping of the milling element takes place essentially along the entire circumference of the outer bearing face. Here an inner bearing face of the receiving element presses against the outer bearing face of the milling element. In comparison, in the prior art there is no force fit on a regular basis, but just a positive form fit between the milling element and the receiving element to provide security against rotation. Here the compressive force on the outer bearing face of the milling element is preferably generated by a wall of the receiving element. The wall of the receiving element can, in particular, be designed to be essentially cylindrical. The inner bearing face of the receiving element is preferably essentially round. The outer bearing face of the milling element is also preferably essentially round. In order to receive the milling element, the receiving element can have what is, in particular, an essentially circular insertion opening on an upper edge region. In accordance with the invention, the compressive force acts on the outer bearing face essentially along the entire circumference. However, the receiving element can have one or a plurality of spreader openings which can facilitate the insertion of the milling element. Needless to say, the receiving element cannot then exert an inwardly directed compressive force at the locations of the spreader openings. The compressive force can be exerted on at least half, in particular on at least two thirds, or at least three quarters, of the outer bearing face of the milling element. The housing is at least partially made from a plastic material, and can have been produced, for example, by means of a plastic injection moulding process. In the context of compressive force, "inwardly" means towards a central longitudinal axis of the spice mill part, which can also coincide with the axis of rotation of the spice mill. If the milling element takes the form, for example, of a milling ring, it is advantageous if the compressive force is directed radially inwards. A milling ring has an essentially circular outer bearing face, and has milling projections on an inner face. The spice mill part, which is designed in particular as a spice mill lower part, is preferably rotatably connected by way of a snap-on connection to another spice mill part, in particular a spice mill upper part. The other spice mill part can have another milling element, in particular a milling cone, with milling projections on an outer surface. Here the spice mill parts can be connected to each other such that the other milling element is at least partially inserted into the milling element, such that a milling gap is created between the two milling elements, in which the spice can be milled. The inner bearing face of the receiving element preferably abuts directly and immediately against the outer bearing face of the milling element, essentially along the entire circumference of the milling element, except for any projections of the milling element.

For the purposes of the present disclosure, directional indications such as "up", "down", "inside" and "outside" refer to a rest position, in which the spice mill part, that is to say, the spice mill, is usually connected to a spice container, and the spice container is placed on the bottom surface located opposite the receiving opening.

In order to facilitate the insertion of the milling element into the receiving element during the completion of the spice mill part, the receiving element can have at least one, preferably two, in particular opposing, spreader recess/es, for purposes of at least partially spreading apart the receiving element. With the aid of the spreader recesses, the receiving element can be spread apart more easily, that is to say, can be expanded in diameter more easily, in order to insert the milling element. The spreading apart process can take place by means of the application of force. After the force has been removed, the receiving element will try to return to its original shape, by virtue of the restoring force of the material. If in the meantime the milling element has been inserted into the receiving element, the receiving element will, from that point onwards, exert the compressive force onto the milling element. The spreader recess can be designed, for example, as a slot, an incision, an opening, or a notch. The spreader recess preferably extends from an upper edge of the receiving element, and in particular, parallel to the central longitudinal axis, in the direction of a lower edge of the receiving element.

In order to facilitate the insertion of the milling element into the receiving element, provision can be made, in particular for production reasons, for the receiving element to have a step, in particular a circumferential step, on the inner bearing face. By means of the step, two regions with differing inner diameters can be created. The step preferably creates a receiving element with an upper region located at the insertion opening of the receiving element, and a lower region, wherein the lower region has a smaller inner diameter than the upper region. The inner diameter of the upper region of the receiving element is preferably at least 0.1 mm, more preferably at least 0.5 mm, larger than the inner diameter of the lower region of the receiving element.

Accordingly, the outer bearing face of the milling element can have a step, in particular a circumferential step. By means of the circumferential step, the outer bearing face is also divided into an upper and a lower region, wherein the lower region preferably has a smaller outer diameter than the upper region. The outer diameter of the upper region of the milling element is preferably at least 0.1 mm, even more preferably at least 0.5 mm, larger than the outer diameter of the lower region of the milling element. By this means, the milling element can first be inserted with a smaller diameter, which essentially corresponds to the inner diameter in the lower region of the receiving element, into the receiving region of larger diameter, without the application of a compressive force, before the two loosely joined parts are fed to a press, in which a plurality of milling elements are generally pressed into the respective receiving elements with the required compressive force, such that the section of the milling element with the smaller diameter is surrounded by the section of the receiving element with the smaller diameter, and the section of the milling element with the larger diameter is surrounded by the section of the receiving element with the larger diameter.

It is advantageous if the milling element has at least one projection on the outer bearing face, preferably extending over the entire height of the outer bearing face. The projection can serve a plurality of purposes at the same time. On the one hand, in this region the milling element is thickened and reinforced, so as to reduce the risk of fracture. On the other hand, the projection can serve to provide security against rotation. For this purpose, if a spreader recess is provided in the receiving element, the projection can be at least partially received in this recess. Furthermore, the milling element can also have an upper collar on an upper edge. The collar fits on the upper edge of the receiving element, more precisely, on the insertion opening, and thus determines how far the milling element can penetrate into the receiving element. The collar can also interact with blocking elements of the receiving element, so that a security against rotation of the milling element in the receiving element is created. For this purpose, the collar can also have flattened sections, or recesses, which interact with the blocking elements of the receiving element.

In one form of embodiment of the spice mill part, provision is made for the projection to have essentially the same contour as the spreader recess, and for the projection preferably to protrude from the outer bearing face, essentially in accordance with an upper collar.

In order, on the one hand, to allow the milling element to be inserted into the receiving element without destroying the receiving element, and, on the other hand, to generate a suitable compressive force that can prevent hairline cracks or their propagation, it has been shown that it is beneficial if the nominal diameter of the inner bearing face of the receiving element is selected during its production such that it is between 1% and 3%, preferably between 1.5% and 2.5%, even more preferably essentially 2% smaller than the nominal diameter of the outer bearing face of the milling element.

In order to achieve as planar a contact as possible between the outer bearing face of the milling element and the inner bearing face of the receiving element over the entire circumference, it is advantageous if, taking into account the manufacturing tolerances of the receiving element and the milling element, the largest possible inner diameter of the inner bearing face of the receiving element essentially corresponds to the smallest possible outer diameter of the outer bearing face of the milling element. Accordingly, an interference fit is ensured even in the case of a non-beneficial coincidence of manufacturing deviations of a receiving element and a milling element (outer diameter of the milling element small, inner diameter of the receiving element large).

In a preferred form of embodiment, provision is made for the receiving element to form a support projection for the milling element on the inner face, which extends radially inwards, essentially at right angles to the inner face of the receiving element. On the one hand, the support projection can serve as a bearing surface for the milling element and/or, on the other hand, if the spice mill part is connected to another spice mill part, it can block the other milling element from penetrating too deeply into the receiving element.

The housing is preferably made from polyoxymethylene, polycarbonate, polypropylene, ABS (acrylonitrile-butadiene-styrene copolymers), polymethyl methacrylate, polyethylene, polyolefins and/or biopolymers.

In order to be able to connect a spice mill part to a spice container, it is advantageous if a thread is provided for connection to the spice container.

In order that a connection can be rotatably connected to another spice mill part, it is advantageous if a preferably circumferential snap-on projection is provided for connection to the other spice mill part. The snap-on projection can be snapped together with another snap-on projection of the other spice mill part, so that any unintentional detachment of the other spice mill part from the spice mill part is prevented, but a rotation of the two spice mill parts relative to each other is made possible.

A development of the invention relates to a spice mill for a spice grinder, wherein a spice mill lower part is provided in accordance with the above statements, which is rotatably connected to a spice mill upper part by way of a snap-on connection, wherein the spice mill upper part has another milling element, in particular a milling cone. The spice mill can be connected to a spice container by way of a thread. The unmilled spice can enter the spice mill by way of an input face, can be milled by rotation in a milling gap formed between the two milling elements, and can exit the spice mill on an output face.

In a development, the invention also comprises a spice grinder with a spice container and a spice mill of the type described above. The spice container is preferably connected to the spice mill by way of a thread.

Furthermore, the invention relates to a method for producing a spice mill part, in particular a spice mill lower part, as described above. The method in accordance with the invention comprises the following steps:

Production of a milling element, in particular a milling ring, consisting of a ceramic material;
Production of a housing with a receiving element for the milling element by means of a plastic injection moulding process;
Insertion of the milling element into the receiving element, such that the milling element is clamped in the receiving element in a force fit, by means of a compressive force directed, in particular, essentially radially inwards, and acting on a closed outer bearing face of the milling element.

With regard to the advantages and features of the spice mill part, reference is made to the above statements. The milling element is produced in a production process that is independent of the production of the housing. There are a plurality of possibilities for the insertion of the milling element into the receiving element.

In accordance with a first embodiment, the milling element is inserted into the receiving element before the receiving element has cooled down to room temperature. In this context, room temperature means a temperature of 25° C. It is particularly beneficial if the milling element is inserted into the receiving element when the housing is (still) at a temperature of at least 35° C. This is because, on the one hand, the material is (still) deformable and, on the other hand, the shrinkage of the material, which later generates and increases the compressive force on the milling element, has not (yet) set in. With regard to the production process, it is beneficial if the milling element is inserted into the receiving element within 180 seconds after removal of the housing from an injection mould.

In order to make the insertion of the milling element independent in terms of time of the temperature or the production process of the housing, it is beneficial if the receiving element has at least one spreader recess, and the receiving element is spread apart for the insertion of the milling element. By means of the spreader recess, the inner diameter of the receiving element can be expanded, and the milling element can thus be inserted. This process can also take place at room temperature.

In what follows, the invention is explained in more detail with the aid of figures, to which, however, it is not intended to be limited.

Two forms of embodiment of the invention are described in more detail below. First the first, and then the second, form of embodiment will be explained.

Figure 1:
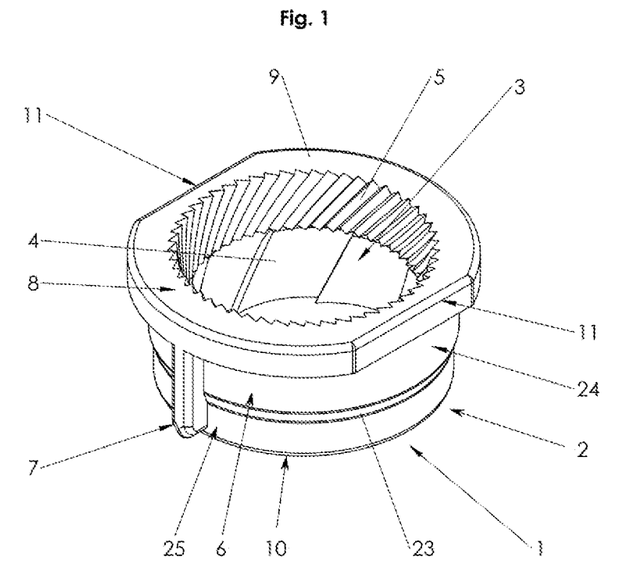
FIG. 1 shows a milling element in the form of a milling ring in accordance with a first form of embodiment.

FIG. 1 shows a milling element 1 in the form of a milling ring 2 made from a ceramic material. The milling element 1 has milling projections 3 on its inner face, which can interact with milling projections of another milling element, for example a milling cone (not shown, see FIG. 13), in order to mill a material that is to be milled in a milling gap located between the two milling elements. The milling ring 2 shown has two different types of milling projections 3 on its inner face, namely coarse milling projections 4 for coarse milling, and fine milling projections 5 for fine milling.

On its outer face, the milling ring 2 has a closed outer bearing face 6 and at least one projection 7, which thickens the milling ring 2 at that position. On an upper edge 8, the milling ring 2 has an outwardly projecting collar 9. The projection 7 adjoins the collar 9, and, in the embodiment shown, extends as far as a lower edge 10 of the milling ring 2, and thus essentially over the entire height of the outer bearing face 6. The collar 9 runs along the upper edge 8, and has a flat 11 on each of two opposing faces, which flats can interact with blocking elements 12 of a receiving element 13 so as to secure the milling ring 2 in the receiving element 13 against rotation (see FIG. 2).

Figure 2:
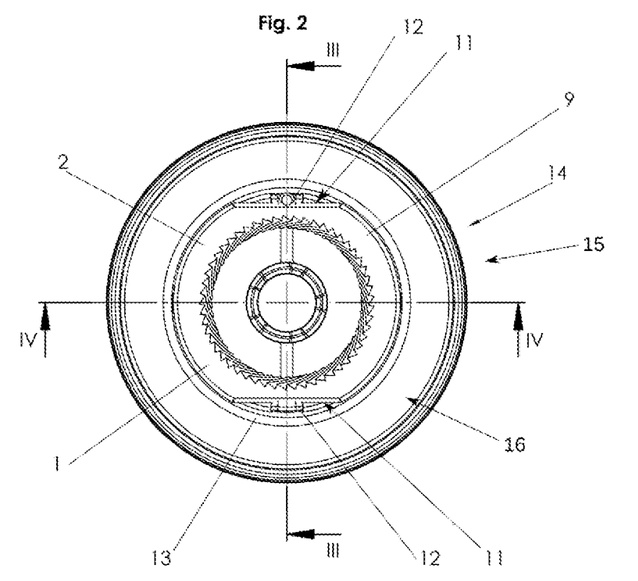
FIG. 2 shows a plan view onto a spice mill part in accordance with a first form of embodiment with a milling ring.

FIG. 2 shows a plan view onto a spice mill part 14 in the form of a spice mill lower part 15 in a first form of embodiment. It can be seen that the milling ring 2 from FIG. 1 is inserted in the receiving element 13. Furthermore, it can be seen that the flats 11 of the collar 9 interact with the blocking elements 12 of the receiving element 13 so as to achieve security against rotation.

Figure 3:
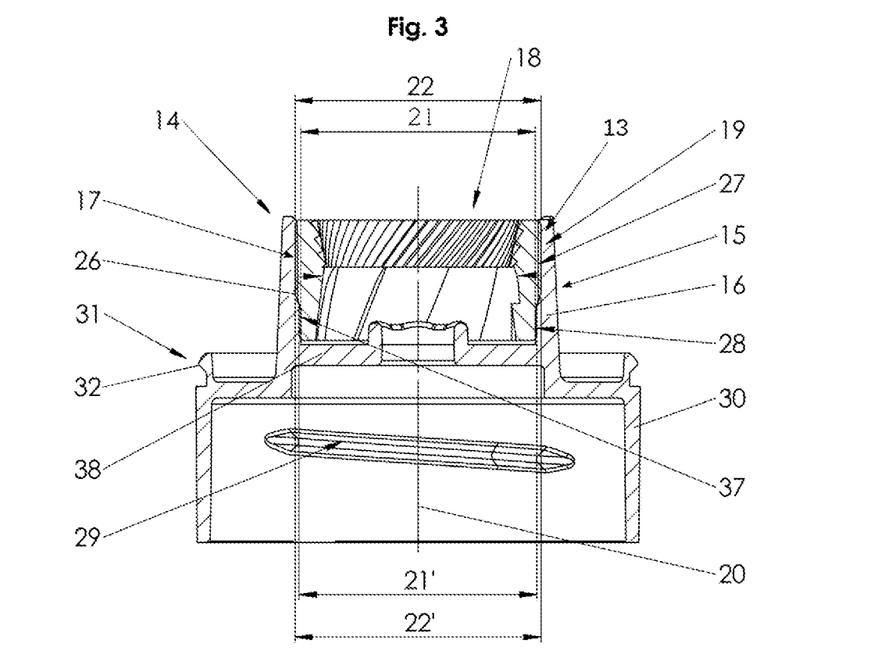
FIG. 3 shows a cross-section of the spice mill part along the sectional plane III-III from FIG. 2.

FIG. 3 shows the spice mill lower part 15 in cross-section along the sectional plane III-III from FIG. 2. The spice mill lower part 15 has a housing 16 made from a plastic material, with a receiving element 13, which has an inner bearing face 17, and into which the milling ring 2 from FIG. 1, as shown, is inserted with a force fit. For the insertion of the milling ring 2, the receiving element has an insertion opening 18 on its upper face. The force fit is created by the compressive force of a wall 19 of the receiving element 13 acting on the milling ring 2 (illustrated by arrows). The compressive force acts radially inwards onto the outer bearing face 6 of the milling ring 2 towards a central longitudinal axis 20 of the spice mill part 14. The application of force, and the intimate reception of the milling ring 2 in the receiving element 13, prevents the formation and propagation of hairline cracks in the milling ring 2. The compressive force arises because the receiving element 13 has a (nominal) inner diameter 21, 21' during production that is smaller than a (nominal) outer diameter 22, 22' of the milling ring 2. This is illustrated by the overlapping cross-sections of the receiving element 13 and the milling ring 2. In other words, in a bearing region the milling ring 2 is larger in cross-section than the inner diameter of the receiving element 13. By the insertion of the milling ring 2 into the receiving element 13, the receiving element 13 is widened. By virtue of the restoring force of the material of the receiving element 13, the compressive force acts on the outer bearing face 6 of the milling ring 2. The compressive force acts essentially along the entire circumference of the outer bearing face 6. The wall 19 is essentially cylindrical in shape and therefore has a round inner contour when seen in plan view. The outer bearing face 6 of the milling ring 2 is also essentially round.

In FIG. 1 and FIG. 3 it can be seen that the outer bearing face 6 of the milling ring 2 has a circumferential step 23. The circumferential step 23 of the milling ring 2 can, for example, be formed by an inclined surface. This divides the outer bearing face 6 into an upper region 24 and a lower region 25, each with a different outer diameter. Furthermore, it can be seen that the receiving element 13 also has a circumferential step 26 on the inner bearing face 17, which also divides the receiving element 13 into an upper region 27 and a lower region 28, each with different inner diameters. The circumferential step 26 of the receiving element 13 can, for example, be formed by an inclined surface. The lower region 25 of the milling ring 2 has a smaller outer diameter compared to the upper region 24 of the milling ring. For example, the outer diameter 22 in the upper region 24 of the milling ring 2 can be essentially 23.5 mm, and the outer diameter 22' in the lower region 25 of the milling ring 2 can be essentially 22.7 mm. The lower region 28 of the receiving element 13 has a smaller inner diameter compared to the upper region 27 of the receiving element 13. For example, prior to insertion of the milling element 1, the inner diameter 21 in the upper region 27 of the receiving element 13 can be essentially 23.0 mm, and the inner diameter 21' in the lower region 28 of the receiving element 13 can be essentially 22.4 mm. The insertion expands the inner diameters of the receiving element 13. The upper region 24 of the milling ring 2 abuts against the upper region 27 of the receiving element 13. The lower region 25 of the milling ring 2 abuts against the lower region 28 of the receiving element 13. By virtue of this configuration, the milling ring 2 can initially be inserted into the receiving element 13 without the application of an inward compressive force, or with only a low inward compressive force. After the transfer of, in each case, two loosely connected parts into a press, a plurality of milling rings 2, for example, up to 24 milling rings, are usually pressed into the respective receiving elements 13 at the same time, with the application of a compressive force of approximately 30 to 100 kg per milling ring. The total inward-pressing force of the press is usually designed for approx. 5,000 kg.

Figure 13:
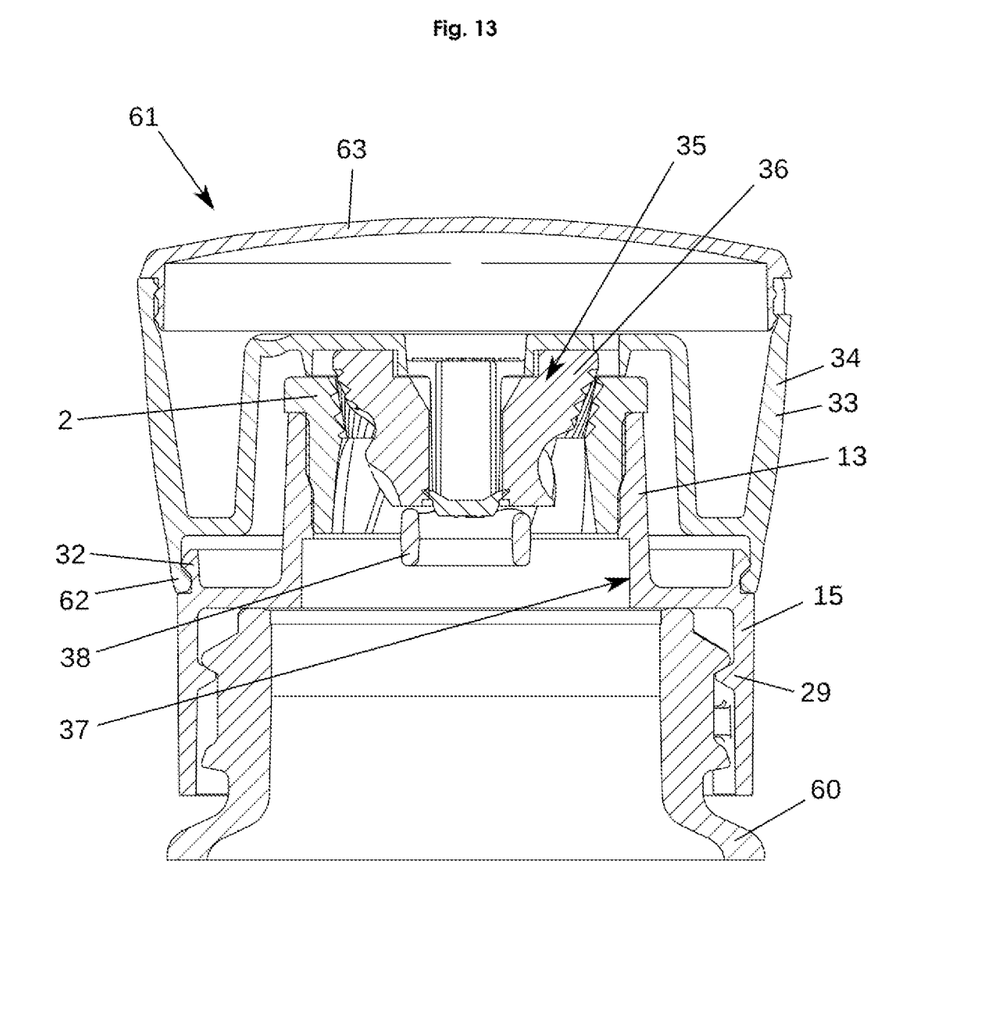
FIG. 13 shows a cross-section of a spice grinder.

In FIG. 3 it can be seen that the spice mill lower part 15 has a thread 29 for connection to a spice container 60 (see FIG. 13). The thread 29 is located on the inner face of a connecting element 30, on the upper face of which is arranged the receiving element 13. In addition, a circumferential snap-on projection 32 is provided on an upper edge 31 of the connecting element 30 for purposes of a rotatable connection to another spice mill part 33 in the form of a spice mill upper part 34 (see FIG. 13). In order to support the milling ring 2 in the receiving element 13, and/or to prevent another milling element 35, for example, a milling cone 36, from penetrating too deeply into the spice mill upper part 34, a supporting projection 38 is formed on the inner face 37 of the receiving element 13 in the example of embodiment shown, which projection extends radially inwards essentially at right angles to the inner face 37 of the receiving element 13.

Figure 4:
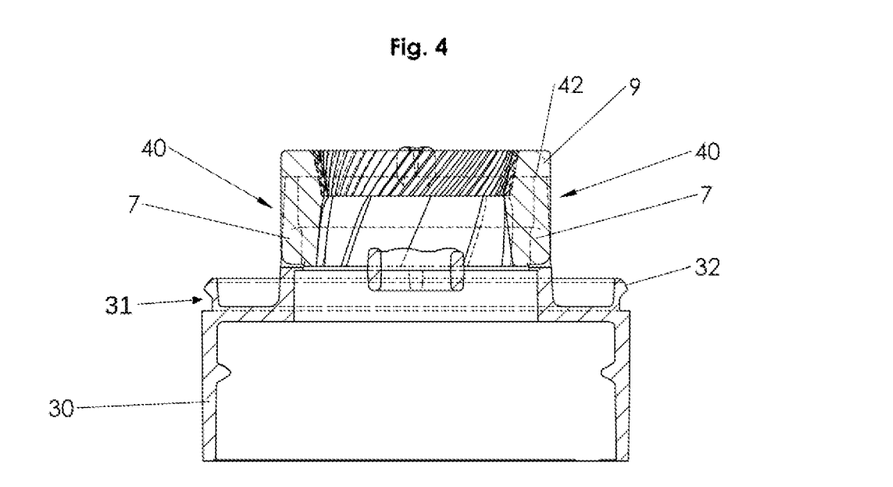
FIG. 4 shows a cross-section of the spice mill part along the sectional plane IV-IV from FIG. 2.

FIG. 4 shows a cross-sectional illustration of the spice mill part 14 in accordance with the first form of embodiment. The cross-section corresponds to the sectional plane IV-IV from FIG. 2. It can be seen that two projections 7 on opposite sides of the milling element 1 are in each case inserted into spreader recesses 40 of the receiving element 13 (compare FIG. 5). It can also be seen that the collar 9 abuts against an upper edge 42 of the receiving element 13.

Figure 5:
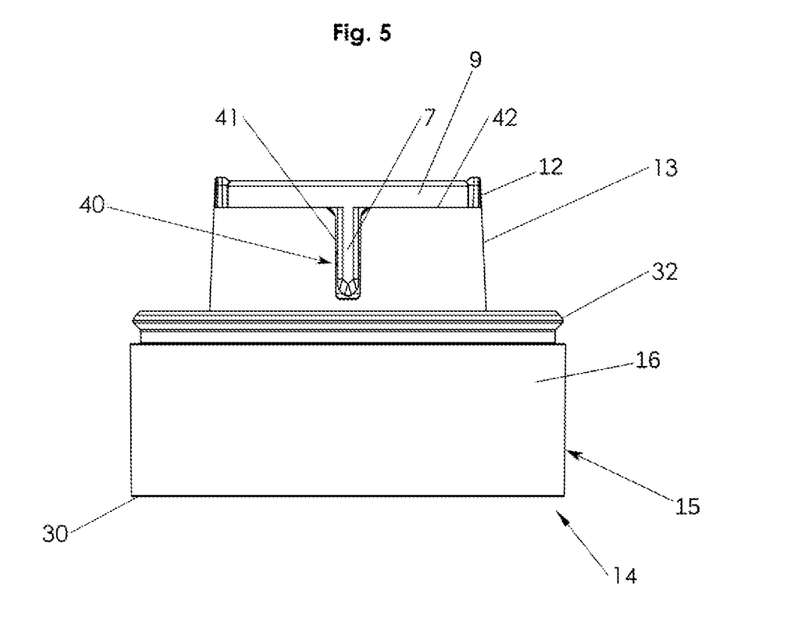
FIG. 5 shows a side view of a spice mill part in accordance with the first form of embodiment.

FIG. 5 shows a side view of the spice mill lower part 15 in accordance with the first form of embodiment. Here, the receiving element 13 has at least one spreader recess 40 in the form of a slot 41. The spreader recess shown extends downwards from an upper edge 42 of the receiving element 13, and enables the receiving element 13 to be spread apart for purposes of inserting the milling ring 2. In addition, a projection 7 of the milling ring 2 can be inserted into the spreader recess 40 (compare FIG. 4). For this purpose, the projection 7 can expediently have essentially the same contour as the spreader recess. 40.

Figure 6:
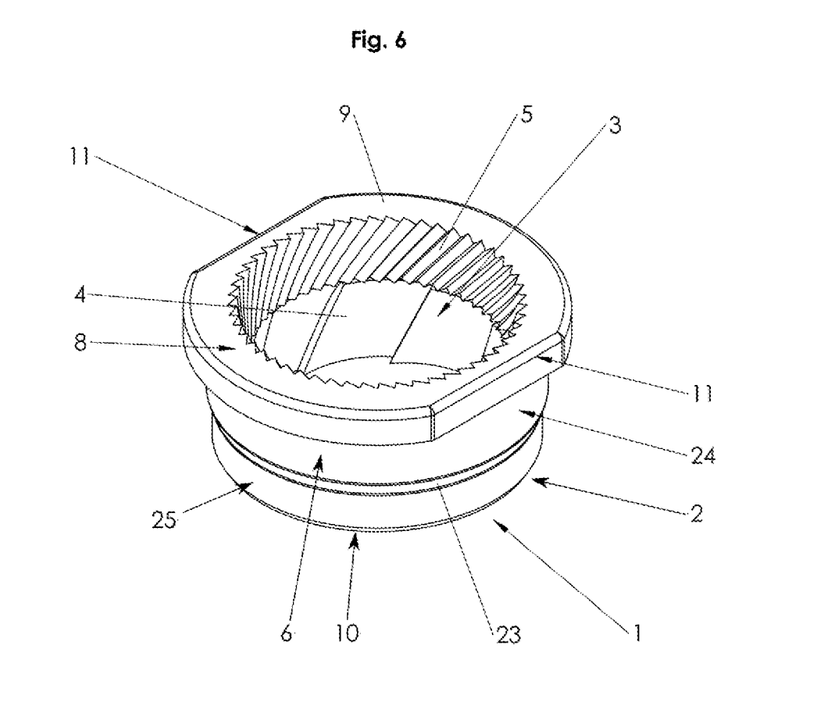
FIG. 6 shows a milling element in the form of a milling ring in accordance with a second form of embodiment.

FIG. 6 shows a milling ring 2 in accordance with a second form of embodiment, which differs from the first form of embodiment in that no projections 7 are provided.

Figure 7:
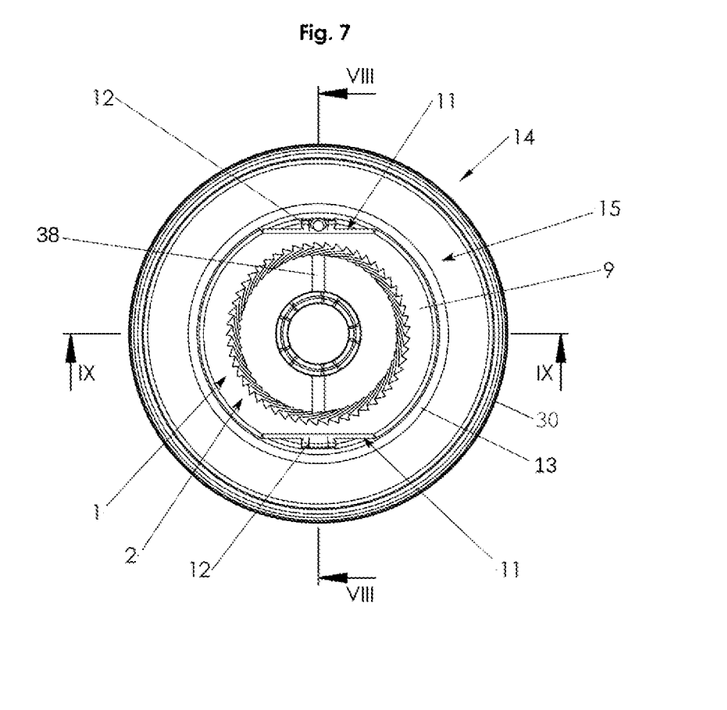
FIG. 7 shows a plan view onto a spice mill part in accordance with a second form of embodiment with a milling ring.

FIG. 7 shows a plan view onto a spice mill part 14 in the form of a spice mill lower part 15 in accordance with a second form of embodiment.

Figure 8:
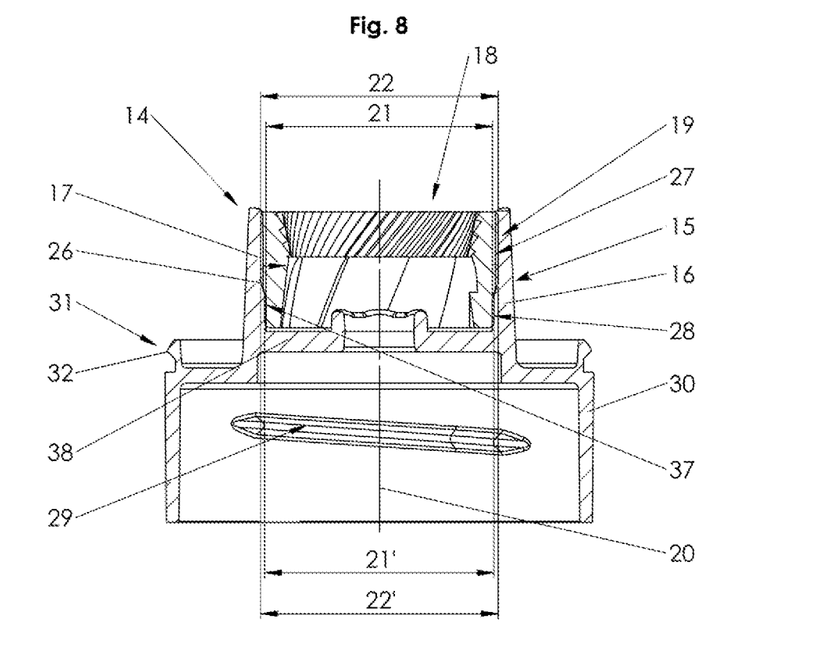
FIG. 8 shows a cross-section of the spice mill part along the sectional plane VIII-VIII from FIG. 7.

FIG. 8 shows the spice mill lower part 15 in cross-section along the sectional plane VIII-VIII from FIG. 7.

Figure 9:
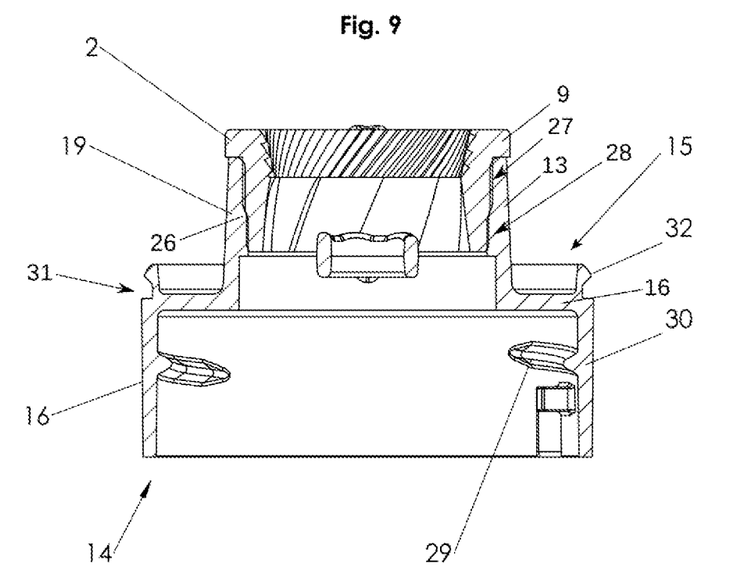
FIG. 9 shows a cross-section of the spice mill part along the sectional plane IX-IX from FIG. 7.

FIG. 9 shows the spice mill lower part 15 in cross-section along the sectional plane IX-IX from FIG. 7. It can be seen that, in contrast to the first form of embodiment, the milling ring 2 does not have any projections 7, which could be received in spreader recesses 40 (which are also not provided in this form of embodiment). After production, when the spice mill part 14 has not yet cooled down to room temperature, the receiving element 13 is (still) larger in circumference. The greater expansion of the receiving element 13 can be used in order to insert or press the milling element 1 into the receiving element 13. With the cooling of the spice mill part 14, the shrinkage of the material sets in, whereby the inner diameter of the receiving element 13 decreases, so that the milling element 1 is clamped in a force fit. Spreader recesses 40 are therefore not necessary.

Figure 10:
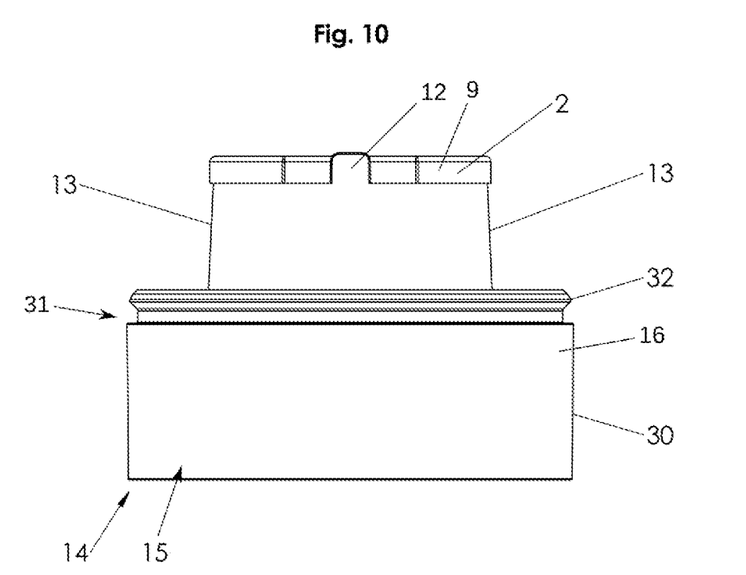
FIG. 10 shows a side view of the spice mill part in accordance with the second form of embodiment.

FIG. 10 shows a side view of the spice mill lower part 15 in accordance with the second form of embodiment. Here, the wall 19 of the receiving element 13 is completely closed along the circumference, that is to say, it is free of openings and recesses, such as spreader recesses 40, etc.

Figure 11:
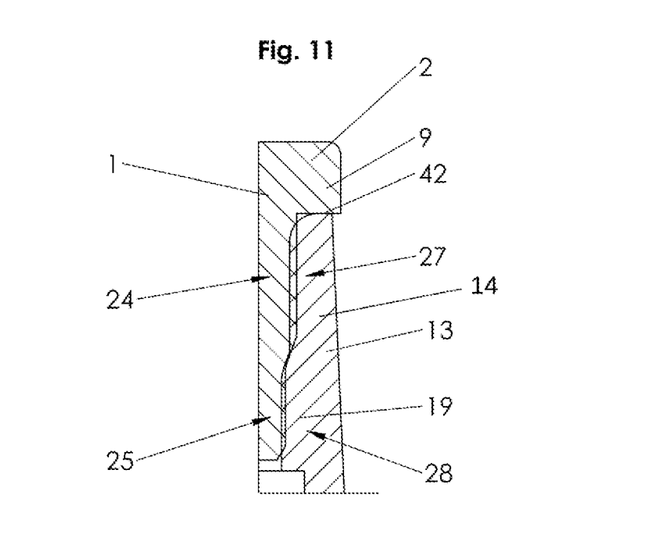
FIG. 11 shows a milling ring and a receiving element in a detail view in cross-section.

FIG. 11 shows a detail of a milling ring 2 with outer diameters 22, 22' (see FIG. 3 or FIG. 8) and a receiving element 13 with inner diameters 21, 21', (see FIG. 3 or FIG. 8). The following comments apply to both forms of embodiment of the spice milling element 14. The receiving element 13 is present in the unexpanded state, in which the milling element 1 is not yet inserted. The cross-sections of the milling element 1 and the receiving element 13 are shown overlapping so as to illustrate the differences between the respective diameters. The expansion of the receiving element 13 in the assembled state of the spice mill part 14 takes place, because the outer diameters 22, 22' of the milling element 1 in the upper 24 and the lower region 25 are larger than the corresponding inner diameters 21, 21' of the receiving element 13 in the upper 27 and the lower region 28 respectively. The difference between the inner diameters 21, 21' of the receiving element 13 and the outer diameters 22,22' of the milling element 1 can be essentially 0.5 mm, for example, as shown in the illustration. In this example, by the insertion of the milling element 1 into the receiving element, the wall 19 of the receiving element 13 is therefore pressed outwards by approx. 0.25 mm in both regions 27, 28.

Figure 12:
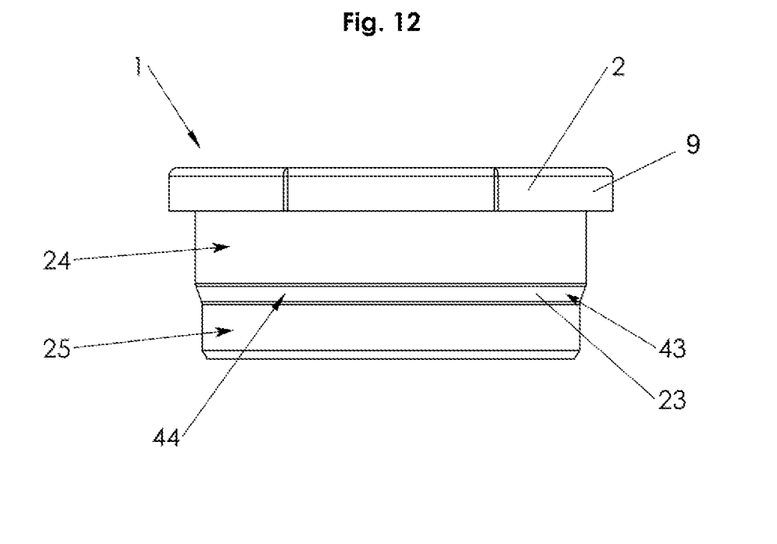
FIG. 12 shows a milling ring in a side view.

FIG. 12 shows a side view of a milling ring 2. The milling ring 2 shown has no projection 7 and corresponds to the second form of embodiment. The following statements can also be applied to the milling ring 2 in accordance with the first form of embodiment. In FIG. 12 it can be seen that the milling ring 2 has a transition region 43, between the upper region 24 and the lower region 25, in the form of a step 23 that converges conically. The transition region 43 is formed by an inclined transition surface 44 in the illustration shown. Compared to the surface of the upper region 25, the transition surface 44 is inclined by more than 10°, preferably by more than 15°, in particular essentially by 20°.

FIG. 13 shows an upper detail from an assembled spice grinder 61. The spice mill lower part 15 is connected to the spice container 60 by way of the thread 29. The spice mill upper part 34 has a circumferential snap-on projection 62, which can be snapped onto the circumferential snap-on projection 32 of the spice mill lower part 15. The spice mill upper part 34 and the spice mill lower part 15 are rotatably connected to each other. A cap 63 is removably connected to the spice mill upper part 34.

The invention claimed is:

1. A spice mill part for a spice mill, said spice mill part comprising:

a housing at least partially comprising a plastic material, said housing configured to be rotatably connected to another spice mill part;

a receiving element is provided on the housing, in which a milling element, made from a ceramic material, is arranged, the milling element being clamped in the receiving element in a force fit, by a compressive force which is directed essentially radially inwards, and acts on a closed outer bearing face of the milling element; and the compressive force configured to on the outer bearing face of the milling element essentially along an entire circumference of the bearing face of the milling element.

2. The spice mill part according to claim 1, wherein; the receiving element has at least one spreader recess for purposes of an at least partial spreading apart of the receiving element.

3. The spice mill part according to claim 1, wherein; the receiving element has a step on an inner bearing face.

4. The spice mill part according to claim 1, wherein; the outer bearing face of the milling element has a step.

5. The spice mill part according to claim 1, wherein; the milling element has at least one projection on the outer bearing face.

6. The spice mill part according to claim 5, wherein; the receiving element has at least one spreader recess for purposes of an at least partial spreading apart of the receiving element; and the at least one projection has essentially the same contour as the spreader recess.

7. The spice mill part according to claim 1, wherein; a nominal diameter of an inner bearing face of the receiving element is selected during its production such that it is between 1% and 3% smaller than a nominal diameter of the outer bearing face of the milling element.

8. The spice mill part according to claim 1, wherein; taking into account manufacturing tolerances of the receiving element and the milling element, a largest possible diameter of an inner bearing face of the receiving element essentially corresponds to a smallest possible diameter of the outer bearing face of the milling element.

9. The spice mill part according to claim 1, wherein; the receiving element forms on an inner face a supporting projection for the milling element, which supporting projection extends radially inwards essentially at right angles to the inner face of the receiving element.

10. The spice mill part according to claim 1, wherein; the housing is made from one or more of the following: polyoxymethylene, polycarbonate, polypropylene, ABS (acrylonitrile-butadiene-styrene copolymers), polymethyl methacrylate, polyethylene, polyolefin and biopolymers.

11. The spice mill part according to claim 1, wherein; a thread is provided for purposes of connecting the spice mill part to a spice container.

12. The spice mill part according to claim 1, wherein; a snap-on projection is provided for purposes of connecting the spice mill part to the another spice mill part.

13. A spice mill for a spice grinder, comprising: a spice mill part according to claim 1, wherein: the spice mill part is a spice mill lower part; the spice mill further comprises a spice mill upper part;

the spice mill lower part is configured to rotatably connect to the spice mill upper part by way of a snap-on connection; and the spice mill upper part comprising another milling element.

14. A spice grinder with spice container and a spice mill, wherein:

the spice mill is a spice mill according to claim 13.

15. The spice mill part according to claim 1, wherein; the spice mill part is a spice mill lower part.

16. The spice mill part according to claim 1, wherein; the other spice mill part is a spice mill upper part.

17. The spice mill part according to claim 1, wherein; the milling part is a milling ring.

18. A method for producing a spice mill part for a spice grinder, said method comprising:

producing a milling element comprising a ceramic material;

producing a housing with a receiving element for the milling element by a plastic injection molding process;

inserting the milling element into the receiving element, so that the milling element is clamped in the receiving element in a force fit by a compressive force directed essentially radially inwards, and acting on a closed outer bearing face of the milling element.

19. A method according to claim 18, wherein:

the milling element is inserted into the receiving element before the receiving element has cooled down to room temperature.

20. A method according to claim 18, wherein:

the receiving element has at least one spreader recess and the receiving element is spread apart for purposes of inserting the milling element.

\* \* \* \* \*